United States Patent [19]

Speca

[11] 4,238,353

[45] Dec. 9, 1980

[54] OLEFIN POLYMERIZATION CATALYST

[75] Inventor: Anthony N. Speca, Cincinnati, Ohio

[73] Assignee: National Petro Chemicals Corp., New York, N.Y.

[21] Appl. No.: 46,985

[22] Filed: Jun. 8, 1979

Related U.S. Application Data

[63] Continuation-in-part of Ser. No. 924,470, Jul. 14, 1978, abandoned.

[51] Int. Cl.$^3$ ............................................... C08F 4/78
[52] U.S. Cl. .................................... 252/428; 252/430; 252/431 C; 252/431 P; 526/96; 526/97; 526/106; 526/105; 526/129; 526/130; 526/134; 526/154; 526/155; 526/156
[58] Field of Search ................... 252/428, 430, 431 C, 252/431 P

[56] References Cited

U.S. PATENT DOCUMENTS

| | | | |
|---|---|---|---|
| 3,984,351 | 10/1976 | Rekers et al. | 252/431 P X |
| 3,985,676 | 10/1976 | Rekers et al. | 252/431 P X |
| 4,049,896 | 9/1977 | Rekers et al. | 526/129 |
| 4,100,104 | 7/1978 | Katzen et al. | 252/428 |

*Primary Examiner*—Patrick Garvin
*Attorney, Agent, or Firm*—Kenneth D. Tremain

[57] ABSTRACT

Olefin polymerization catalysts are prepared by depositing an organophosphoryl chromium product and a nonvolatile aluminum-containing product obtained from the reaction of an aluminum alkoxide and an aluminum salt of a lower aliphatic monocarboxylic acid on an inorganic support material and heating the support material in a non-reducing atmosphere at a temperature above about 300° C. up to the decomposition temperature of the support material.

15 Claims, No Drawings

OLEFIN POLYMERIZATION CATALYST

CROSS-REFERENCE TO RELATED APPLICATION

This application is a continuation-in-part of copending application Ser. No. 924,470, filed July 14, 1978, now abandoned.

BACKGROUND OF THE INVENTION

1. Field of the Invention

This invention relates to the fields of olefin polymerization catalysts and processes for polymerizing olefins in the presence of chromium-containing supported catalysts.

2. Description of the Prior Art

The use of chromium compounds in the polymerization of olefins is well-known. U.S. Pat. Nos. 2,825,721 and 2,951,816 disclose the use of chromium trioxide supported on an inorganic material such as silica, alumina or combinations of silica and alumina, and activated by heating in reducing atmospheres, to polymerize olefins. When, however, a catalyst system of this type is used in techniques such as the well-known particle-form process, the resins produced, while useful in many applications, are unsatisfactory for others because of a deficiency in certain properties such as melt index.

Attempts to improve the properties of polyolefins produced using supported, heat-activated chromium oxide catalysts have been made by adding various compounds to the supported chromium oxide prior to the heat activation thereof. For example, U.S. Pat. No. 3,622,522 shows that an alkoxide of gallium or tin may be added to supported chromium oxide prior to heat activation (and compares unfavorably the addition of aluminum isopropoxide). U.S. Pat. No. 3,715,321 suggests adding a compound of a Group II-A or Group III-B metal to supported chromium oxide prior to heat treatment, whereas U.S. Pat. No. 3,780,011 discloses adding alkyl esters of titanium, vanadium or boron, and U.S. Pat. No. 3,484,428 discloses adding alkyl boranes to such catalyst.

It is also known to utilize other chromium compounds in the preparation of olefin polymerization catalysts. Such compounds include various silyl chromate and polyalicyclic chromate esters as described, for example, in U.S. Pat. Nos. 3,324,095; 3,324,101; 3,642,749; and 3,704,287. Other such catalysts are disclosed in U.S. Pat. Nos. 3,474,080 and 3,985,676, and commonly assigned application Ser. No. 759,213, filed Jan. 13, 1977, now U.S. Pat. No. 4,100,104. These catalysts may be employed with organometallic reducing agents such as, for example, trialkyl aluminum compounds.

It has been disclosed in U.S. Pat. Nos. 3,984,351 and 4,049,896 that the properties of olefin polymers, e.g., melt indexes, can be substantially improved by the use of a catalyst prepared by depositing an organophosphoryl chromium compound and an aluminum compound such as aluminum sec-butoxide on an inorganic support material and heat-activating the supported composition in a nonreducing, preferably oxygen-containing atmosphere, at a temperature of from about 300° C. up to the decomposition temperature of the support. The resulting material which is preferably combined with a metallic and/or non-metallic reducing agent, provides a catalyst system capable of producing polymers having improved flow properties and shear responses in addition to increased melt indexes.

It is among the objects of the present invention to provide another improved technique for preparing olefin polymerization catalysts, and a polymerization process utilizing the same which results in the formation of polymers having high melt indexes and other desired characteristics, such as variations in the molecular weight distribution.

SUMMARY OF THE INVENTION

In accordance with the present invention, it has been found that an effective olefin polymerization catalyst can be prepared by depositing an organophosphoryl chromium product and a non-volatile aluminum-containing product obtained from the reaction of an aluminum alkoxide and an aluminum salt of a lower aliphatic monocarboxylic acid on an inorganic support material and heating the support material in a non-reducing atmosphere at a temperature above about 300° C. up to the decomposition temperature of the support material.

Preparation of the organophosphoryl chromium compound which is deposited upon an inorganic support material in accordance with the present invention follows the procedure described in U.S. Pat. No. 3,985,676, this patent being incorporated by reference herein.

It is also within the scope of the present invention to deposit the non-volatile aluminum-containing reaction product upon the support followed by a first heat-activation step and thereafter to deposit the chromium compound upon the support followed by a second heat-activation step as in the double activation procedure described in commonly assigned U.S. Pat. No. 4,100,104 referred to above. Double activation of the catalysts herein has been observed to provide still further increases in polymer melt indexes.

If desired, the heat-activated catalysts can be treated with a metallic and/or non-metallic reducing agent as taught in U.S. Pat. No. 3,984,351.

The catalysts of this invention are amenable to use with conventional polymerization processes and are suitable for polymerization effected under temperature and pressure conditions generally employed in the art, e.g., temperatures of from about 30° C. to about 250° C. and preferably from about 70° C. to about 110° C., and pressures of from about 200 to about 1000 psig and preferably from about 300 to about 800 psig as are used in slurry polymerizations.

DESCRIPTION OF THE PREFERRED EMBODIMENTS

The organophosphoryl compounds which are deposited upon the inorganic support material are prepared by reacting an organophosphorus compound with chromium trioxide in an inert solvent, e.g., cyclohexane, n-hexane, methylene chloride, carbon tetrachloride, etc. In this step in the preparation of the catalyst system, the solid $CrO_3$ is slurried in the solvent and the organophosphorus compound added. Over a period of time, e.g., about one hour the reaction between the compounds is complete and the chromium trioxide disappears. During this period the solution becomes reddish-brown in color. It is ordinarily filtered simply to insure the absence of any unreacted solid $CrO_3$. This solution is then applied to the support material in such manner as to effect the deposition of the catalyst solution thereon, suitably by any wet coating technique, e.g., spraying.

Typically, the solution is added to a dispersion of the support. The solvent is removed from the base by drying, e.g., using heat, inert gas stripping, or reduced pressure alone or in combination. In this manner, the reaction product is placed on the support material. It is considered significant that the organophosphoryl chromium reaction product is preformed, i.e., the reacting entities are combined prior to the introduction to the support. The active catalyst is therefore understood not to derive from chromium trioxide but the organophosphoryl chromium reaction product as described.

Among the organic phosphorus compounds which can be used in the preparation of the organophosphoryl chromium compounds are the triorganophosphates and diorganophosphates including such compounds as triphenyl phosphate, tributyl phosphate, triethyl phosphate, trioctyl phosphate, trimethyl phosphate, etc. Also suitable are the mono(-dihydrogen) phosphate or phosphite and di(hydrogen) phosphate derivatives, (illustratively inclusive of monobutyl phosphate, dibutyl phosphate and monoethyl phosphite) and these materials may of course comprise mixtures. Organophosphoryl chromium reaction products are also formed with such phosphorus based compounds as phenyl phosphoric acid, diethyl phosphonate and trioctyl phosphine oxide. Preferred compounds can be represented by structures of the type:

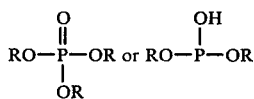

wherein R is alkyl, aralkyl, aryl, cycloalkyl, or hydrogen, but at least one R is other than hydrogen. For ease of description the operable materials are referred to in the specification and claims collectively and comprehensively as "organophosphoryl chromium" reaction products.

The non-volatile aluminum-containing product which is also deposited upon the inorganic support in accordance with this invention is prepared by reacting an aluminum alkoxide of the general formula

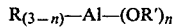

in which n is 1, 2 or 3 and R and R′ are each lower alkyl, with an aluminum carboxylic acid salt of the general formula

in which R″ is lower alkyl. Among the aluminum alkoxides which can be employed herein are included aluminum sec-butoxide, aluminum ethoxide, aluminum propoxide, aluminum isopropoxide, aluminum n-butoxide, methyl aluminum propoxide, diethyl aluminum ethoxide, diisobutyl aluminum ethoxide, and the like. In the preferred aluminum alkoxides, n will be three and of these alkoxides, aluminum sec-butoxide is the most preferred. Illustrative of a aluminum carboxylic acid salts which can be reacted with the foregoing aluminum alkoxides in accordance with this invention are aluminum acetate, aluminum formate, aluminum propionate, aluminum butyrate, aluminum isobutyrate, and so forth. Aluminum acetate, $Al(OOCCH_3)_3$, is preferred. The reaction of the aluminum alkoxide and the aluminum carboxylic acid salt can be conveniently carried out by refluxing the reactants in a suitable inert solvent which is normally an anhydrous organic solvent. Such organic solvents include aliphatic, cycloalkyl and alkylaryl hydrocarbons and their halogenated derivatives, e.g., toluene, xylene and decalin. The molar ratios of the reactants can vary over wide limits, ratios of aluminum alkoxide to aluminum carboxylic acid salt of from 1:10 to 10:1 being useful with ratios of these reactants of from 1:3 to 3:1 being especially preferred. Similarly, refluxing temperatures and reaction periods can extend over a wide range. Thus, for example, the aluminum alkoxide and the aluminum carboxylic acid salt can be refluxed at a temperature of from about 50° C. to about 250° C. for a period of from about 15 minutes to about 24 hours. Excellent results have been obtained at refluxing temperatures of from about 120° C. to 200° C. and reaction periods of from about 3 to 22 hours. During the reaction, the initially insoluble aluminum alkoxide slowly dissolves in the solvent and in some cases, the solvent develops a readily discernible change in color. In addition to the desired non-volatile aluminum-containing product, the reaction also provides a volatile product which serves no use in this invention. At present, the precise nature of the non-volatile aluminum-containing reaction product is not known although it is considered likely that it actually constitutes a mixture of compounds. Without desiring to be bound in any way by the following possible explanation, it has been speculated that the reaction of aluminum alkoxide and aluminum carboxylic acid salt occurs in two steps, the first step forming a complex of the two reactants and the second step forming $\mu$-oxoaluminum compounds and volatiles.

The inorganic support materials useful in the present invention include those normally employed in supported chromium catalysts used in olefin polymerizations such as those discussed in U.S. Pat. No. 2,825,721. Typically, these support materials are inorganic oxides of silica, alumina, silica-alumina mixtures, thoria, zirconia and comparable oxides which are porous, have a medium surface area, and have surface hydroxyl groups. Preferred support materials are silica xerogels or xerogels containing silica as the major constituent. Especially preferred are the silica xerogels described in U.S. Pat. Nos. 3,652,214; 3,652,215; and 3,652,216 which silica xerogels have a surface area in the range of about 200 to about 500 m²/g and a pore volume greater than about 2.0 cc/g, a major portion of the pore volume being provided by pores having diameters in the range of from about 300 to about 600 angstrom units.

The catalysts of the present invention can be prepared by depositing the organophosphoryl chromium compound and the non-volatile aluminum-containing reaction product described above on the inorganic support in any suitable manner. The organophosphoryl chromium compound can be deposited by vapor coating or in a suitable inert solvent. The aluminum-containing product can be deposited in a suitable inert solvent such as those which can be utilized as the reaction medium in which the aluminum-containing product is prepared. Dichloromethane is a preferred solvent for this purpose. The organophosphoryl chromium compound can be applied to the support first or the aluminum-containing product can be applied first or the chromium and aluminum products can be applied together. In the usual method of catalyst preparation, the support is impregnated first with the organophosphoryl chromium compound and then the aluminum-containing product.

In accordance with the alternative double activation treatment of the catalysts herein, the non-volatile aluminum-containing reaction product is first deposited upon the support as in the above-described single activation procedure and the coated support is initially heat activated in a non-reducing atmosphere, preferably in a dry oxygen-containing atmosphere, at temperatures of at least about 130° C., and up to the decomposition temperature of the support. Typically, the support having the aluminum-containing reaction product deposited thereon is heated at a temperature of from about 130° C. to about 1100° C., and preferably from about 260° C. to about 820° C. The period required for the initial activation operation varies, depending upon the temperatures utilized, from one-half hour or less, to about 50 hours or more, and normally, is effected over a period of from about 2 to about 12 hours. Double activation is completed by thereafter depositing the organophosphoryl chromium compound upon the aluminum-containing support in the manner previously described for the single activation procedure and heating the thus treated support in a preferably dry oxygen-containing atmosphere, at temperatures above about 430° C. up to the decomposition temperature of the support. Activation is suitably carried out at temperatures of from about 430° C. to about 1100° C., best results having been obtained by activation at temperatures of from about 840° C. to about 990° C. Activation can be carried out in this, the final heating operation, for periods varying from about one-half hour or less to 50 hours or more, and most frequently, for periods varying from about 2 to about 12 hours.

The most effective catalysts have been found to be those containing the organophosphoryl chromium compound in an amount such that the amount of Cr by weight based on the weight of the support is from about 0.25 to 2.5% and preferably is from about 0.5 to 1.25%, although amounts outside of these ranges still yield operable catalysts. The aluminum-containing product should be added in sufficient amounts to provide from about 0.1 to 10% of aluminum by weight based on the weight of the support and preferably from about 0.5 to 5.5% although other amounts outside of these ranges can be used to prepare operable catalysts.

After the organophosphoryl chromium compound and the aluminum-containing product have been deposited on the inorganic support, the support is heated in a non-reducing atmosphere, preferably in an oxygen-containing atmosphere, at a temperature above about 300° C. up to the decomposition temperature of the support. Typically, the supported compositions are heated at a temperature of from 500° C. to 1000° C. The heating time may vary, for example, depending on the temperatures used, from one-half hour or less to 50 hours or more. Normally the heating is carried out over a period of 2 to 12 hours. The non-reducing atmosphere which is preferably air or other oxygen containing gas should be dry and preferably should be dehumidified down to a few parts per million (ppm) of water to obtain maximum catalyst activity. Typically, air used in the procedure described in this application is dried to less than 2–3 ppm of water.

The heat-treated supported chromium-containing and aluminum-containing catalyst of the present invention can, if desired, be used in combination with metallic and/or non-metallic reducing agents. Examples of metallic reducing agents include trialkyl aluminums, such as triethyl aluminum, triisobutyl aluminum, alkyl aluminum halides, alkyl aluminum alkoxides, dialkyl zinc, dialkyl magnesium and metal borohydrides including those of the alkali metals, especially sodium, lithium and potassium, and of magnesium, beryllium and aluminum. The non-metallic reducing agents include alkyl boranes such as triethyl borane, triisobutyl borane, and trimethyl borane and hydrides of boron such as diborane, pentaborane, hexaborane and decaborane.

The heat-treated catalysts herein can be combined with the metallic or non-metallic reducing agent prior to being fed to an olefin polymerization reactor or these two components may be fed separately to an olefin polymerization reactor.

In proportioning the amount of metallic or non-metallic reducing agent to the amount of chromium compound used in the catalyst systems of the present invention, fairly wide latitude is available, but some guidelines have been established consistent with good yield, favorable polymer properties and economic use of materials. For example, in the use of metallic and/or non-metallic reducing agents with an amount of chromium compound sufficient to yield about 1% Cr by weight of the support the parameters set forth below are representative. The atomic ratios are based upon a calculation of the metal in the metallic reducing agent and/or the non-metal in the non-metallic reducing agent versus the chromium content present in the chromium compound on the support.

For example, based upon a catalyst composition containing about 1% by weight of Cr based upon the weight of the support, the preferred amount of an organometallic reducing agent for use therewith, e.g., triisobutyl aluminum (TIBAL), is about 11.4% by weight and equivalent to an Al/Cr atomic ratio of about 3/1. The preferred range of atomic ratios of Al to Cr is from about 0.5/1 to about 8/1, or from about 1.9% to about 30% by weight TIBAL. The overall practicable limits of TIBAL in terms of the Al/Cr atomic ratio are from about 0.1/1 to 20/1, and in terms of weight are from about 0.4% to about 75% by weight.

Another example of an organometallic reducing agent for use in conjunction with the catalyst composition of the present invention is triethyl aluminum. Again based upon a catalyst composition containing about 1% by weight of Cr based upon the weight of the support, the preferred amount of triethyl aluminum (TEA) is about 6.6% by weight based upon the weight of the support giving an Al/Cr atomic ratio of about 3/1. The preferred range of atomic ratios of Al to Cr is from about 0.5/1 to about 8/1, or from about 1.1% to about 18% by weight of TEA. The overall practicable limits of TEA, in terms of an Al/Cr ratio, are from about 0.1/1 to 20/1, and in terms of weight are from about 0.22% to about 44% by weight.

Triethyl boron (TEB) may be taken as the preferred example of the proportions of non-metallic reducing agent for use in conjunction with the catalyst composition of the present invention. Again based upon a catalyst composition containing about 1% by weight of Cr based upon the weight of the support, the preferred amount of TEB is about 5% by weight based upon the weight of the support giving a B/Cr atomic ratio of about 2.7/1. The preferred range of atomic ratios of B to Cr is from about 0.1/1 to 10/1, or from about 0.19 to about 19% TEB. The overall practicable limits, in terms of a B/Cr ratio, are from about 0.01/1 to about 20/1, and in terms of weight are from about 0.02% to about 38% by weight based upon the weight of the support.

The preparation of catalysts in accordance with this invention is described in the procedures given below:

PREPARATION OF NON-VOLATILE ALUMINUM-CONTAINING REACTION PRODUCTS OF ALUMINUM SEC-BUTOXIDE AND ALUMINUM ACETATE

EXAMPLE A 4.43 g aluminum acetate, 21.7 mmol, was charged into a flask along with 65.5 g $CH_2Cl_2$. 5.34 g aluminum sec-butoxide, 21.7 mmol, was added and the contents refluxed under nitrogen. After refluxing for 3 hours, the clear gray solution was stirred at room temperature overnight. The volatiles were removed in vacuo to yield 9.30 g of a clear viscous residue (0.47 g weight loss based on non-volatile starting materials). Assuming no loss in aluminum content, the residue contains the original 43.4 mmol Al $$\% Al = \frac{43.4 \text{ mmol Al} \times \frac{27 \times 10^{-3} \text{ g Al}}{\text{mmol}}}{9.30 \text{ g residue}} \times 100\% = 12.6\%$$

EXAMPLE B 4.06 g (19.9 mmol) aluminum acetate, 5.15 g (20.9 mmol) aluminum sec-butoxide and 52.4 g toluene were combined as above. Within 15 minutes of the start of refluxing, the acetate had dissolved to yield a pale yellow viscous solution. As refluxing progressed, the color intensified while the viscosity diminished. After 6 hours refluxing, the volatiles were removed in vacuo to yield 7.78 g of a gray viscous residue (1.43 g weight loss) containing 14.1% Al.

EXAMPLE C 6.49 g (31.8 mmol) aluminum acetate, 7.92 g (31.8 mmol) aluminum sec-butoxide and 157.4 g xylene were used. The acetate dissolved readily as refluxing occurred. The temperature of the refluxing volatiles (head temperature) dropped to 134° C. during 5 hours of refluxing. Distillation of 108 g of volatile material increased the reflux temperature to 138.5° C. 76.7 g of fresh xylene was added and refluxing continued. After 22 hours refluxing, 95.3 g distillate was collected and upon cooling the remaining volatiles were removed in vacuo. The viscous gray residue weighed 9.13 g (5.28 g weight loss) and contained 18.8% Al.

EXAMPLE D 4.74 g (23.2 mmol) aluminum acetate, 11.45 g (46.4 mmol) aluminum sec-butoxide and 85.25 g xylene were used. As the cloudy mixture was heated, a yellow coloration developed. At the boiling point the cloudiness rapidly dissipated to yield a clear yellow solution. After 5 hours refluxing 26.7 g of distillate was removed (head temperature increased 135° to 138° C.). No fresh xylene was added. After 22 hours refluxing, a gray color was evident and another 31.2 g distillate was collected (head temperature increased 136.5° to 138° C.). Upon cooling the remaining volatiles were removed in vacuo. The viscous gray-green residue weighed 12.17 g (4.02 g weight loss) and contained 15.4% Al.

EXAMPLE E 6.23 g (30.9 mmol) aluminum acetate, 15.22 g (61.8 mmol) aluminum sec-butoxide and 95.4 g decalin were heated to reflux. A clear yellow solution was obtained at reflux (head temperature 153° C.). After 2 hours refluxing the yellow color had dissipated to yield a water-white solution (head temperature 150° C.). After 5.5 hours refluxing 37.8 g distillate was collected (head temperature increased 150° to 189° C.). After 22 hours refluxing a gray solution was obtained. 54.8 g distillate was collected (head temperature increased 159° to 189° C.). The remaining volatiles were removed in vacuo to yield a white solid weighing 10.32 g (11.22 g weight loss) and containing 24.2% Al.

The data for the reaction products of Examples A to E is summarized in Table I as follows:

| Reaction Product | Mole Ratio (alkoxide/ acetate) | Solvent B.P. °C. | Ratio (g volatiles/ g acetate) | % Al* in residue (theoretical) |
|---|---|---|---|---|
| A | 1.0 | $CH_2Cl_2$ 40 | 0.2 | 12.6 |
| B | 1.0 | toluene 110 | 0.35 | 14.2 |
| C | 1.0 | xylene 140 | 0.81 | 18.8 |
| D | 2.0 | xylene 140 | 0.85 | 15.4 |
| E | 2.0 | decalin 195 | 1.78 | 24.2 |

*Starting mixtures contain 12.0% Al (A, B and C) and 11.6% Al (D and E)

II. PREPARATION OF HEAT ACTIVATED CATALYST A

A silica gel having a pore volume of about 2.5 cc/g prepared in accordance with the disclosure in U.S. Pat. No. 3,652,215 is added to a 2000 ml, three-neck round bottom flask equipped with a stirrer, nitrogen inlet and y-tube with water condenser. A nitrogen atmosphere is maintained during the coating operation. Dichloromethane is then added to the flask containing the silica gel and stirring is commenced to insure uniform wetting of the gel. A dichloromethane solution of the reaction product of $CrO_3$ and triethyl phosphate prepared as described in U.S. Pat. No. 3,985,676 is then added to the flask in sufficient quantity to provide a dry coated catalyst containing about 1% by weight of Cr. The supernatant liquid is removed by filtration and the coated gel is dried in a rotary evaporator at up to about 40° C. and with 20–40 mm Hg vacuum.

Dichloromethane is then added to the flask containing the supported chromium composition prepared in the above step (approximately 8 g dichloromethane per g of silica gel) and stirring is commenced to insure uniform wetting of the gel. A solution of dichloromethane and the non-volatile reaction product of Example A above is prepared in a pressure equalizing dropping funnel and the funnel attached to the stirred flask. The aluminum-containing solution is gradually added to the flask at the rate of about 10 grams of solution per minute. After the addition of the solution is complete the slurry in the flask is stirred for about 1 hour. The supernatant liquid is removed by filtration and the coated gel is dried in a rotary evaporator at temperatures up to about 40° C. and 20–40 mm Hg vacuum. The amount of aluminum compound added depends on the % aluminum desired for the production of olefin polymers having specific properties necessary for certain end use applications.

To heat activate the catalyst composition, the supported catalyst is placed in a cylindrical container an fluidized with dry air at 30–40 meters per hour lineal velocity while being heated to a temperature of 900° C. and held at this temperature for 6 hours. After cooling under nitrogen, the activated supported catalyst is recovered as a powder.

In the same manner as described above, heat activated catalysts IIB to IIE were prepared with each of the non-volatile aluminum-containing reaction products of Examples B to E.

In the Table II, catalysts IIA to IIE were employed in the polymerization of ethylene with the following results:

TABLE II

| Example | Catalyst | % Al Doping | H₂ (psig) | MI[a] | HLMI[b] | HLMI/MI |
|---|---|---|---|---|---|---|
| 1 | IIA | 3.7 | 30 | 2.0 | 160 | 80 |
| 2 | IIA | 3.7 | 120 | 4.9 | 436 | 89 |
| 3 | IIB | 3.7 | 30 | 2.1 | 163 | 76 |
| 4 | IIB | 3.7 | 120 | 3.5 | 260 | 74 |
| 5 | IIC | 1.85 | 30 | 3.1 | 162 | 53 |
| 6 | IIC | 1.85 | 120 | 3.7 | 211 | 57 |
| 7 | IIC | 3.7 | 30 | 4.1 | 268 | 65 |
| 8 | IIC | 3.7 | 120 | 4.3 | 389 | 91 |
| 9 | IID | 1.85 | 30 | 7.5 | 512 | 68 |
| 10 | IID | 1.85 | 120 | 13.9 | — | — |
| 11 | IID | 3.7 | 30 | 30 | — | — |
| 12 | IID | 3.7 | 120 | 60 | — | — |
| 13 | IIE | 1.85 | 30 | 1.0 | 96 | 96 |
| 14 | IIE | 1.85 | 120 | 1.0 | 77 | 77 |
| 15 | IIE | 3.7 | 30 | 1.3 | 122 | 92 |
| 16 | IIE | 3.7 | 120 | 1.0 | 76 | 75 |

Reactor Conditions

| | |
|---|---|
| Temperature | 100° C. |
| Diluent | iso-butane |
| Reducing Agent | 0.5 cc triethyl borane in hexane/g catalyst (B/Cr≈3 to 1) |
| Ethylene | 10 mole % |
| Productivity | 300–600 g polyethylene/g catalyst |

[a]Melt Index, ASTM-D-1238, Condition E
[b]High Load Melt Index, ASTM-D-1238, Condition F The polyethylene resins obtained in the polymerizations summarized in Table II were analyzed by gel permeation chromatography with the results recorded in Table III as follows:

TABLE III

| Polyethylene Resin | MI | $M_n^2 \times 10^{-4}$ | $M_w^3 \times 10^{-4}$ | $R^4$ |
|---|---|---|---|---|
| Example 1 | 2.0 | 0.43 | 3.80 | 8.84 |
| Example 3 | 2.1 | 0.93 | 6.35 | 6.83 |
| Example 7 | 4.1 | 0.83 | 4.60 | 5.54 |
| Example 9 | 7.5 | 0.62 | 6.04 | 9.74 |
| Example 11 | 30 | 0.49 | 2.89 | 5.90 |
| Example 15 | 1.3 | 0.82 | 6.14 | 7.49 |

TABLE III-continued

| Polyethylene Resin | MI | $M_n^2 \times 10^{-4}$ | $M_w^3 \times 10^{-4}$ | $R^4$ |
|---|---|---|---|---|
| Control[1] | 13 | 0.37 | 3.05 | 8.24 |

[1]Heat-activated reaction product of chromium oxide and triethyl phosphate and aluminum sec-butoxide modifier deposited on silica gel to an aluminum content of 3.7% was employed as catalyst.
[2]Mn is number average molecular weight
[3]Mw is weight average molecular weight
[4]R is the ratio of Mw/Mn As shown in the above data, the polyethylenes produced with the catalysts of this invention generally have narrow molecular weight distributions (MWD) compared to the polyethylene produced with the control catalyst as demonstrated by the R values in Table III. In addition, each of the polyethylenes prepared by the catalysts of the invention have a significantly different set of properties as compared to that prepared by the control catalyst as a review of the demonstrated properties in Table III clearly shows. To substantiate the observed MI and narrow MWD, as well as the reproducibility of the catalyst systems herein, reaction product D was synthesized again and used to prepare an identical catalyst system.

Somewhat larger scale polymerizations were carried out. The polyethylene resins obtained using catalysts in accordance with this invention were compared with polyethylenes prepared with catalysts heretofore used in olefin polymerization. The properties of the polyethylenes are summarized in Table IV as follows:

TABLE IV

| Example | | MI | Mn × 10⁻⁴ | Mw × 10⁻⁴ | R |
|---|---|---|---|---|---|
| 18 | Heat-activated reaction product of chromium trioxide and triethyl phosphate on silica gel with aluminum sec-butoxide modifier. | .19 | 1.48 | 12.5 | 8.5 |
| 19 | Same as Example 18 but with the addition of 2:1 reaction product of aluminum sec-butoxide and aluminum acetate refluxed in xylene as modifier, in place of the aluminum sec-butoxide modifier. | .21 | 1.53 | 9.95 | 6.5 |
| 20 | Same as Example 19 but with the addition of hydrogen gas to the polymerization zone. | .60 | 1.49 | 8.78 | 5.85 |
| 21 | Same as Example 18 but with the addition of hydrogen gas to the polymerization zone. | 1.12 | 1.41 | 9.19 | 6.55 |

The polyethylene resins prepared with catalysts of this invention (Examples 19 and 20) possessed a significantly narrower MWD compared to the corresponding polyethylenes of prepared using known catalysts systems (Examples 18 and 21) thus confirming the observations which had been noted above.

What is claimed is:

1. A process for preparing an olefin polymerization catalyst system which comprises:
   (a) depositing an organophosphoryl chromium reaction product of chromium trioxide and a phosphorus compound having the formula

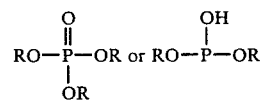

wherein R is alkyl, aralkyl, aryl, cycloalkyl, or hydrogen but at least one R is other than hydrogen, upon a solid inorganic support material;

(b) depositing the non-volatile aluminum-containing product obtained from the reaction of an aluminum alkoxide and an aluminum carboxylic acid salt upon said support material; and, (c) heat-activating said supported organophosphoryl chromium reaction product and non-volatile aluminum-containing reaction product in a non-reducing atmosphere at a temperature above about 300° C. up to the decomposition temperature of the support material.

2. The process for preparing a catalyst according to claim 1 wherein the non-volatile aluminum-containing reaction product is first deposited upon the support material and the thus treated support is heat activated in a non-reducing atmosphere at a temperature of at least about 130° C. up to the decomposition temperature of the support, and the organophosphoryl chromium reaction product is thereafter deposited upon the support and the thus treated support is again heat-activated but at a temperature above about 300° C. up to the decomposition temperature of the support.

3. The process for preparing a catalyst system according to claim 1 or 2 wherein said support material contains silica gel.

4. The process for preparing a catalyst system according to claim 3 wherein said silica gel is a silica xerogel having a surface area in the range of about 200 to about 500 m²/g and a pore volume greater than about 2.0 cc/g, a major portion of the pore volume being provided by pores having diameters in the range of from about 300 to about 600 angstrom units.

5. The process for preparing a catalyst system according to claim 1 or 2 wherein the organophosphoryl chromium reaction product is derived from the reaction of chromium trioxide and triethyl phosphate.

6. The process for preparing a catalyst system according to claim 1 or 2 wherein the non-volatile aluminum-containing product is obtained from the reaction of aluminum sec-butoxide and aluminum acetate.

7. The process for preparing a catalyst system according to claim 1 or 2 wherein a metallic and/or non-metallic reducing agent is added to the heat-activated catalyst.

8. The process for preparing a catalyst system according to claim 7 wherein the reducing agent is a metallic reducing agent selected from the group consisting of triethyl aluminum, triisobutyl aluminum, alkyl aluminum halide, alkyl aluminum alkoxide, dialkyl zinc, dialkyl magnesium and metal borohydride.

9. The process for preparing a catalyst system according to claim 7 wherein the reducing agent is a non-metallic reducing agent selected from the group consisting of alkyl borane and hydrides of boron.

10. The process of preparing a catalyst system according to claim 9 wherein the alkyl borane is triethyl borane.

11. The process of preparing a catalyst system according to claim 1 or 2 wherein the organophosphoryl chromium reaction product is present in an amount sufficient to provide about 0.25 to about 2.5% by weight of Cr based upon the weight of the support material and the non-volatile aluminum-containing product is present in an amount sufficient to provide about 0.10 to about 10% by weight of Al based upon the weight of the support material.

12. The olefin polymerization catalyst system produced by the process of claim 1 or 2.

13. The olefin polymerization catalyst system of claim 12 wherein the organophosphoryl chromium reaction product is derived from the reaction of chromium trioxide and triethyl phosphate.

14. The olefin polymerization catalyst system of claim 12 wherein the non-volatile aluminum-containing product is obtained from the reaction of aluminum sec-butoxide and aluminum acetate.

15. The olefin polymerization catalyst system of claim 12 to which a metallic and/or non-metallic reducing agent is added.

* * * * *